Patented July 27, 1937

2,087,900

UNITED STATES PATENT OFFICE 2,087,900

CHEWING GUM BASE

William H. Carmody, Pittsburgh, Pa., assignor to The Neville Company, Pittsburgh, Pa., a corporation of Pennsylvania No Drawing. Application November 6, 1936, Serial No. 109,528

8 Claims. (Cl. 99—135)

This invention relates to chewing gum bases containing synthetic resin, and especially to improvements in those containing coumarone-indene resin.

It is among the objects of the invention to provide chewing gum bases containing coumarone-indene resin in a form which is substantially colorless and tasteless, which when warmed has a slight but pleasing odor, but is substantially odorless when cold, which is highly soluble in mineral oils, is permanent in its characteristics, possesses physical qualities especially adapting it to chewing gum production, and is free from disadvantages encountered heretofore in the use of this resin in the manufacture of chewing gum bases.

It has been proposed heretofore to use coumarone-indene resin in the manufacture of chewing gum bases. As previously available commercially, however, the resin has been subject to disadvantages which have militated against its widespread adoption and use for this purpose. In the manufacture of resin for this purpose one practice has been to control the polymerization to produce resins having a relatively low number of coumarone and indene units, and then to steam distil to remove solvent but to leave in the soft resin those polymers occurring as oils. Another practice has been to produce a hard resin which is then softened to the required melting point by the blending in of the oily coumarone-indene polymers of relatively low molecular weight. Resin as produced by both of those procedures has possessed a characteristic taste and odor which have been objectionable in the manufacture of chewing gum bases. Conseqently, various purifying treatments have been applied to the resin to eliminate small amounts of substances thought to cause the objectionable taste and odor. Thus the resin has been washed with caustic soda solution at elevated temperatures, or a stream of hot air has been blown through the molten resin in a container kept under reduced pressure. The object of these and other treatments has been to obtain a resin which is odorless and tasteless when used in gum base. None of the treatments heretofore applied has produced a resin of completely acceptable odor and taste.

I have discovered, and it is upon this that the present invention is predicated, that the foregoing objections to coumarone-indene resin are eliminated and chewing gum bases of improved character are provided by compounding the other ingredients of the base with hydrogenated coumarone-indene resin. More particularly, I have discovered that hydrogenation of this resin renders it completely tasteless and odorless when cold. The hydrogenated resin has a slight odor when warmed, but this odor is acceptable, and even desirable, in the gum trade because the odor is mild, not sharp, and is actually cooling and agreeable so that it blends with and contributes to the effect of the other ingredients of the base and the flavoring matter added to the gum base in making up the finished product.

An important advantage of the hydrogenated resin is that it is greatly soluble in mineral oils, while its original solubility in aromatic solvents is not detrimentally affected. Ordinary commercial coumarone-indene resin is of rather low solubility in mineral oils and therefore in making chewing gum bases from the harder grades of resin it has been necessary to temper them with the oily coumarone-indene low polymers to obtain satisfactory melting point and plasticity. It is reasonable to suppose that the objectionable odor and taste have resulted, in part at least, from such oily material or traces of impurities contained in it. The great solubility of the hydrogenated resin in mineral oils thus permits the use of these bland and permanently tasteless and odorless materials for tempering, or modifying, the resin to obtain desired physical properties.

A further important advantage of the hydrogenated resin arises from the fact that hydrogenation converts it to a substantially colorless condition, whereas the ordinary commercial resin as used heretofore is of a pale reddish amber color. The lack of color in the hydrogenated resin thus permits the production of a gum base which is substantially uncolored.

The coumarone-indene resin may be hydrogenated according to various practices. I prefer to effect the hydrogenation by means of a metallic nickel catalyst suspended in a solution of the resin heated to an elevated temperature. For example, the resin and a suitable solvent, such as petroleum benzene, may be heated to about 200° C., whereby the resin melts and dissolves. For most purposes a suitable catalyst is made by adding finely powdered nickel-aluminum alloy to caustic soda solution, washing the nickel residue free from salts, and adding it to the resin without undue exposure to air. Using about 3 per cent by weight of such a catalyst suspended in a solution as just referred to, the hydrogenation may be effected satisfactorily by admitting hydrogen into the container to a pressure of, say, 900 pounds per square inch, and permitting the hydrogenation to proceed until the desired degree of hydrogenation has been effected. After hydrogenation the catalyst is filtered out and the resin solution removed and the solvent distilled from it, leaving the resin ready for use. The hydrogenation of coumarone-indene resin is disclosed in greater detail and claimed in my copending application Serial No. 1,897, filed January 15, 1935.

The invention resides in the use of such hydrogenated coumarone-indene resin in the manufacture of chewing gum bases. The exact constituents and proportions of constituents vary according to the manufacturer's formula and the particular type of gum which is to be produced. Accordingly, it is not possible to give either exact constituents or exact proportions although in general chewing gum bases are compounded from gum grade rubber, waxes, balsams, vegetable oils, and other constituents. The invention resides essentially in the use of hydrogenated coumarone-indene resins in such compositions in which such resin is desirable, not in the exact ingredients or their relative proportions.

In the manufacture of gum base from coumarone-indene resin it is necessary to bring the resin to a melting point of about 60° to 70° C., which is considered optimum in the trade because this melting point is that which gives a gum that is satisfactorily plastic when chewed. Also, it is thought that the resins occurring in latex and rubber melt in this range, and little interference with these natural resins is encountered if the added resin has a similar melting point. The desired melting point can be obtained, as indicated hereinabove, by tempering the resin with mineral oil. Using, for example, a resin having a melting point of 165° C., it may be brought to the desired melting range by the addition of from about 20 to about 30 per cent of mineral oil. My experiences have shown that the use of about 22 per cent of added oil provides a melting point of about 70° C., while the melting point may be lowered to 60° C. by the addition of about 26 to 27 per cent of mineral oil.

As an example of the invention a resin having a melting point of 60° C., as described above, was compounded in accordance with the following formula:

| | Parts |
|---|---|
| 60° C. resin | 65 |
| Rubber | 27 |
| Olive oil | 5 |
| Candelilla wax | 4 |

This yielded a base which was satisfactorily plastic and which could be chewed readily. The resin used had the desirable result of reduced softening effect on the rubber, due to the substitution of mineral oil for aromatic polymer oils used heretofore in tempering the coumarone-indene resin. The composition had no objectionable odor or taste, and these properties remained permanent on chewing. The plasticity was not altered by prolonged chewing, nor did the composition soften to the point of complete collapse or become too sticky for use.

A characteristic desired in gums is that of slight resistance to distortion while not possessing excessive springiness. When stretched the gum should show only slight tendency to return to its original dimension. Gum made with hydrogenated coumarone-indene resin in accordance with the present invention embodies these features.

The use of wax acts as a softener of the resin and at the same time is immiscible with the rubber.

From what has been said it will be understood that the invention constitutes a substantial improvement in the art flowing from the provision of a resin which is free from taste and objectionable odor, of stable character, suitably compatible with other constituents of the base, and provides satisfactory mechanical properties. The more important advantages appear from the following comparative summation:

| Property | Resin Not hydrogenated | Resin Hydrogenated |
|---|---|---|
| Odor | No odor cold. Sharp and solvent-like when warmed. | No odor cold; when warmed, mild, resembling wax or beeswax, cooling and agreeable. |
| Taste | Sometimes has a rank taste called "acid." | Without taste. |
| Color | Pale reddish amber | Colorless. |
| Solubility | Soluble in aromatic solvents; less soluble in mineral oils. | Soluble in aromatic solvents; greatly soluble in mineral oils. |
| Stability | Soft varieties develop odor due to content of oily polymers. | No changes occur in resin; mineral oil content of permanent odor-taste qualities. |

According to the provisions of the patent statutes, I have explained the principle and mode of practicing my invention and have described what I now consider to represent its best embodiment. However, I desire to have it understood that, within the scope of the appended claims, the invention may be practiced otherwise than as specifically described.

I claim:

1. A chewing gum base containing hydrogenated coumarone-indene resin, said resin being tasteless and colorless.

2. A chewing gum base containing hydrogenated coumarone-indene resin tempered with mineral oil.

3. A chewing gum base containing a composition consisting of hydrogenated coumarone-indene resin and about 20 to 30 per cent of mineral oil and having a melting point of about 60° to 70° C.

4. A chewing gum base containing rubber and a composition consisting of hydrogenated coumarone-indene resin and about 20 to 30 per cent of mineral oil and having a melting point of about 60° to 70° C.

5. A chewing gum base composition comprising chewing gum grade rubber, wax, and hydrogenated coumarone-indene resin.

6. A chewing gum base composition comprising chewing gum grade rubber, wax, vegetable oil, and hydrogenated coumarone-indene resin.

7. A chewing gum base comprising chewing gum grade rubber, wax, vegetable oil, and a composition consisting of hydrogenated coumarone-indene resin and mineral oil and having a melting point of 60° to 70° C.

8. A chewing gum base comprising about 27 parts of rubber, about 4 parts of candallila wax, about 5 parts of olive oil, and about 65 parts of a mixture of hydrogenated coumarone-indene resin and mineral oil and having a melting point of about 60° to 70° C.

WILLIAM H. CARMODY.